T. JERVIS.
HANGING SUSPENSION FOR ELECTRICAL TRANSMISSION LINES.
APPLICATION FILED NOV. 18, 1911.
1,058,673.
Patented Apr. 8, 1913.
2 SHEETS—SHEET 1.
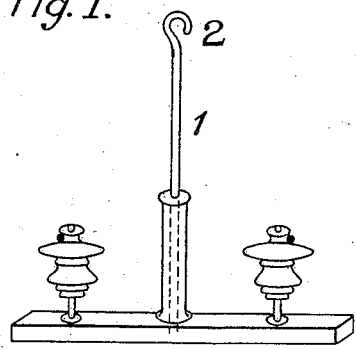
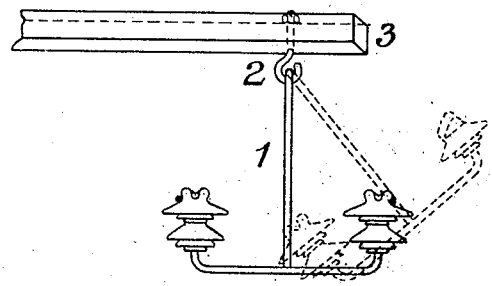
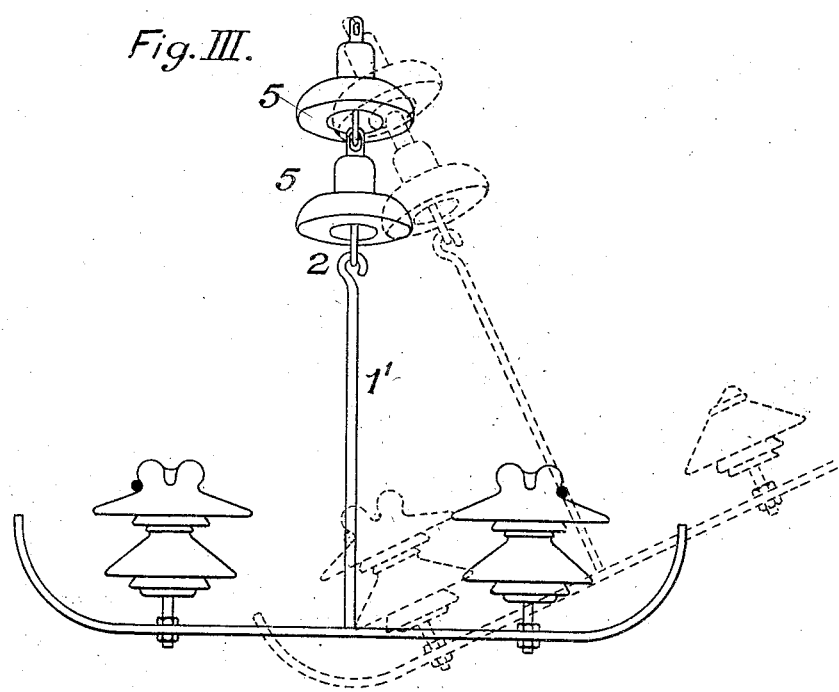
WITNESSES:
INVENTOR:

T. JERVIS.
HANGING SUSPENSION FOR ELECTRICAL TRANSMISSION LINES.
APPLICATION FILED NOV. 18, 1911.
1,058,673.
Patented Apr. 8, 1913.
2 SHEETS—SHEET 2.
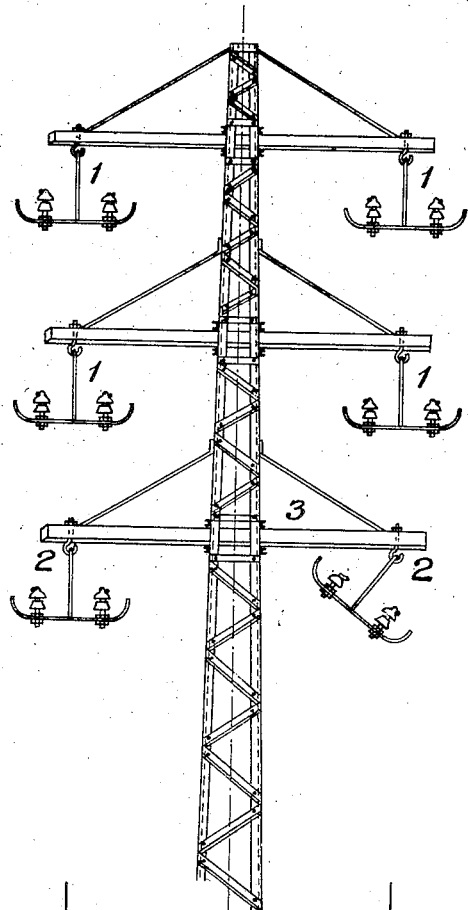
Fig. V.
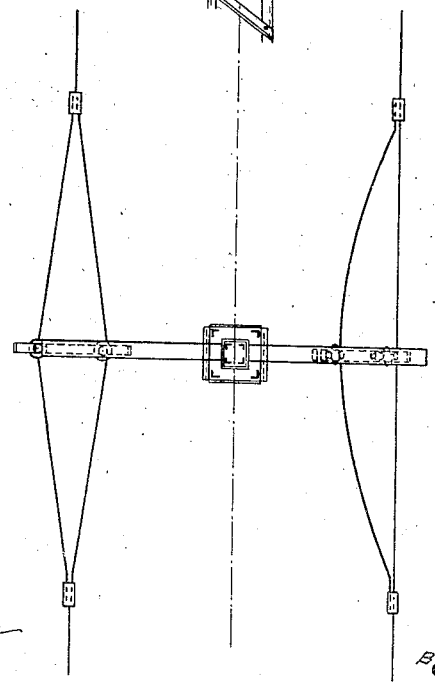
Fig. IV.
WITNESSES:
John C. Sanders
Albert F. Heuman
INVENTOR:
Tommaso Jervis,
BY
ATT'Y.

UNITED STATES PATENT OFFICE.

TOMMASO JERVIS, OF BRESCIA, ITALY.

HANGING SUSPENSION FOR ELECTRICAL-TRANSMISSION LINES.

1,058,673.   Specification of Letters Patent.   Patented Apr. 8, 1913.

Application filed November 18, 1911. Serial No. 661,053.

*To all whom it may concern:*

Be it known that I, TOMMASO JERVIS, a subject of the King of Italy, residing at No. 32 Rouchi Pusterta, Brescia, Italy, have invented certain new and useful Improvements in Hanging Suspensions for Electrical-Transmission Lines, of which the following is a specification.

This invention relates to suspension devices for electric conductors and the object thereof is to provide a means of suspension which is particularly useful for two purposes, one of which purposes is to strengthen or reinforce the suspension of such conductors, and the other purpose is to render it possible to readily detect when and where a break in the conductor has occurred or is about to occur.

The invention is particularly applicable for use in high voltage electric current transmission systems where it is essential that every safeguard possible should be utilized to lessen the danger of accidents resulting from falling live wires.

It is well known in practice that invariably the break in a conductor occurs at its connection to the fixed supports or suspenders, and this arises on account of the wearing strain resulting at this point, due to the swaying of the conductor, acting on the conductor at the point where it is attached to the rigid suspender. To overcome this defect it has previously been proposed to employ a flexible suspension device which will swing with the conductor, and while the present invention embodies a suspension device of this kind, additional means are employed whereby the improved suspension device is rendered more serviceable in practice.

The accompanying drawings illustrate the invention, in which drawings—

Figure 1 is a side view of a hanger; Fig. 2 is a side view of a hanger fixed to an arm; Fig. 3 is an enlarged view of a hanger; Fig. 4 is a plan view showing the duplex connections of the conductors, and Fig. 5 is an elevation of a pole fitted with arms and hangers.

Referring now to the drawings, 1 is the hanger which is adapted to be secured by a universal joint 2, which may be an ordinary hook and eye, to cross arm 3 or any other fixed point. The hanger is of an inverted T or anchor shape having a cross piece which carries a pair of ordinary insulators. The conductor and a reinforcing wire secured thereto, are attached to the insulators in a manner as shown on the left hand side of Fig. 4, and by this manner of attachment the strain on the conductor is distributed equally to the two insulators. As shown on the right hand side of Fig. 4, the conductor itself takes all the strain, the additional reinforcing length of wire being slack and is held in reserve to support the conductor in case the latter breaks at the point of support.

The cross arms from which the hangers are suspended, are carried by a pole in the usual manner and from which pole a number of similar arms and hangers are supported for the purpose of suspending an equal number of conductors, and for high voltage currents particular attention must be paid to the insulation; consequently in carrying out the invention, the usual provision is made for such insulation, and as an additional precaution insulating strain ears 5 are provided at the point where the hangers are attached to the cross arms.

When in operation, the equilibrium of the improved suspender is maintained in its normal or perpendicular position by the balanced strain imparted to the two insulators, but should the conductor break, the equilibrium is at once disturbed and the hanger will then swing laterally into an inclined position as shown, and by this disarrangement a weakness of the suspension can be detected at once and proper repairs made before serious damage takes place.

Having now described my invention I claim:—

1. In electric transmission line construction, in combination, a pivotally suspended hanger comprising a supporting member and an arm connected to the lower end thereof, said arm being at right angles to said member and extending on opposite sides thereof, an insulator mounted upon each end of said arm, a conductor connected to one of said insulators, and a reinforcing wire connected to the other of said insulators and to said conductor.

2. In electric transmission line construction, in combination, a pivotally supported hanger provided with insulators positioned on the opposite sides of the point of support, a conductor connected to one of said insulators, and a reinforcing wire connected to the other of said insulators and to said conductor.

In testimony whereof I have hereunto set my hand in presence of two subscribing witnesses.

TOMMASO JERVIS.

Witnesses:
PIERO FIANOLIO,
JOCELYN GOUBEYRAN.